US009286267B2

(12) United States Patent
Zohar et al.

(10) Patent No.: US 9,286,267 B2
(45) Date of Patent: *Mar. 15, 2016

(54) PERFORMING ROUNDING OPERATIONS RESPONSIVE TO AN INSTRUCTION

(71) Applicant: Intel Corporation, Santa Clara, CA (US)

(72) Inventors: Ronen Zohar, Sunnyvale, CA (US); Shane Story, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 411 days.

This patent is subject to a terminal disclaimer.

(21) Appl. No.: 13/793,648

(22) Filed: Mar. 11, 2013

(65) Prior Publication Data

US 2013/0191433 A1 Jul. 25, 2013

Related U.S. Application Data

(63) Continuation of application No. 11/525,420, filed on Sep. 22, 2006.

(51) Int. Cl.
*G06F 9/30* (2006.01)
*G06F 17/10* (2006.01)
*G06F 7/499* (2006.01)

(52) U.S. Cl.
CPC ............ *G06F 17/10* (2013.01); *G06F 9/30014* (2013.01); *G06F 9/30167* (2013.01); *G06F 9/30181* (2013.01); *G06F 7/49947* (2013.01)

(58) Field of Classification Search
CPC .......................... G06F 9/30014; G06F 9/30167
See application file for complete search history.

(56) References Cited

U.S. PATENT DOCUMENTS

| 5,696,709 | A | * | 12/1997 | Smith, Sr. ...................... 708/551 |
| 5,812,439 | A | * | 9/1998 | Hansen .......................... 708/497 |
| 5,864,703 | A | | 1/1999 | Van Hook |
| 6,044,454 | A | | 3/2000 | Schwarz et al. |
| 6,055,555 | A | | 4/2000 | Boswell et al. ............... 708/551 |
| 6,058,410 | A | * | 5/2000 | Sharangpani ................. 708/551 |
| 6,292,815 | B1 | | 9/2001 | Abdallah et al. .............. 708/204 |
| 6,820,106 | B1 | | 11/2004 | Vijayrao |
| 6,879,992 | B2 | | 4/2005 | Zohar ............................ 708/550 |

(Continued)

FOREIGN PATENT DOCUMENTS

| CN | 1195808 A | 10/1998 |
| CN | 1503150 A | 6/2004 |

(Continued)

OTHER PUBLICATIONS

German Patent Office, Office Action Mailed Aug. 18, 2014, In German Application No. 11 2007 001 989.1-53.

(Continued)

*Primary Examiner* — Benjamin Geib
(74) *Attorney, Agent, or Firm* — Trop, Pruner & Hu, P.C.

(57) ABSTRACT

In one embodiment, the present invention includes a method for receiving a rounding instruction and an immediate value in a processor, determining if a rounding mode override indicator of the immediate value is active, and if so executing a rounding operation on a source operand in a floating point unit of the processor responsive to the rounding instruction and according to a rounding mode set forth in the immediate operand. Other embodiments are described and claimed.

20 Claims, 5 Drawing Sheets

(56) References Cited

U.S. PATENT DOCUMENTS

| | | | |
|---|---|---|---|
| 6,889,242 B1* | 5/2005 | Sijstermans et al. | 708/551 |
| 6,996,591 B2 | 2/2006 | Zohar | 708/277 |
| 2006/0095714 A1* | 5/2006 | Boggs et al. | 712/22 |

FOREIGN PATENT DOCUMENTS

| | | |
|---|---|---|
| EP | 1089165 | 4/2001 |
| JP | 2011263344 | 12/2011 |
| JP | 5475746 | 4/2014 |

OTHER PUBLICATIONS

Clive Maxfield, "An Introduction to Different Rounding Algorithms", Programmable Logic Design Line, Jan. 4, 2006, pp. 1-15.
Andrew S. Tanenbaum, Structured Computer Organization, 2nd edition, Prentice-Hall, 1984, p. 11.
State Intellectual Property Office, P.R. China, Office Action mailed Oct. 23, 2012 in Chinese application No. 201010200409.X.
State Intellectual Property Office, P.R. China, Decision on Rejection issued May 21, 2012 in Chinese patent application No. 200710170152.6.
State Intellectual Property Office, P.R. China, Office Action issued Sep. 7, 2011 in Chinese application 200710170152.6.
Japanese Patent and Trademark Office, Office Action mailed Aug. 9, 2011 in Japanese application No. 2009-528536.
State Intellectual Property Office, P.R. China, Third Office Action in Chinese application No. 200710170152.6.
Japanese Patent Office, Notification of Reasons for Refusal dated Nov. 29, 2010 in Japanese patent application No. 2009-528536.
Rospatent, Federal State Institute, Federal Institute for Industrial Property Under the Federal Service for Intellectual Property, Patents, and Trademarks, Official Action issued on Jun. 29, 2010 in Russian application No. 2009115188/08.
State Intellectual Property Office, P.R. China, Second Office Action Issued on Feb. 5, 2010, in Chinese patent application No. 200710170152.6.
German Patent and Trademark Office, Office Action dated Feb. 11, 2010, in German patent application No. 11 2007 001 989.1-53.
Korean Patent Office, Notice of Preliminary Rejection dated Jun. 26, 2009, in a related application.
State Intellectual Property Office, P.R. China, First Office Action dated May 9, 2009, in a related application.
International Search Report and Written Opinion for Corresponding PCT Application No. PCT/US2007/079233, Feb. 29, 2008, 11 pages.
Freescale Semiconductor, "High-Performance Processors; AltiVec Technology," 2004, pp. 1-4.
Author unknown, "Assembler Language Reference: frsp (Floating Round to Single Precision) Instruction," Sep. 14, 2002, pp. 1-3.
Author unknown, "Assembler Language Reference: Floating-Point Processor," Sep. 14, 2002, pp. 1-3.
Kip Irvine, "Assembly Language for Intel Based Computers," Mar. 21, 2003, Chapter 17.
"PowerPC User Instruction Set Architecture—Book 1—Version 2.02," Jan. 28, 2005, Chapter 4.
German Patent Office, Office Action Mailed Jun. 5, 2014, in German Application No. 11 2007 001 989.1.
Sivarama P. Dandamudi, Guide to Assembly Language Programming in Linux, Springer, 2005., p. 443-458, New York, NY.
Japanese Patent Office, Office Action Mailed Mar. 31, 2015, In Japanese Patent Application No. 2014-021474.
U.S. Patent and Trademark Office, Office Action Mailed Feb. 2, 2015 and Reply filed May 1, 2015, in U.S. Appl. No. 11/525,420.
Chinese Patent Office, Office Action mailed Aug. 5, 2015, in Chinese Patent Application No. 201310524726.0.
Japanese Patent Office, Office Action mailed Jul. 28, 2015, in Japanese Patent Application No. 2014-021474.
Chinese Patent Office, Reexamination Decision mailed Jul. 23, 2015, in Chinese Patent Application No. 200710170152.6.

* cited by examiner

PERFORMING ROUNDING OPERATIONS RESPONSIVE TO AN INSTRUCTION

This application is a continuation of U.S. patent application Ser. No. 11/525,420, filed Sep. 22, 2006, the content of which is hereby incorporated by reference.

BACKGROUND

Processors perform various mathematical operations on data. The data may be of different types, including, for example, integer values and floating point (FP) values with different intrinsic precision. When dealing with FP values, it is possible that a result of a mathematical operation, such as multiplication or addition, among other such operations, generates a result that needs to be converted to a lower precision format. Accordingly, a rounding operation can be performed to round the FP result.

While such round operations can be performed as part of different mathematical operations, in some processor architectures there is limited or no ability to perform a round operation on a data element as a standalone operation, or without the need for multiple complex steps. For example, a processor may be configured to perform rounding of a FP value to an integer value according to a default rounding mode. However, a given source operand may need to be rounded according to a different mode for various reasons. To effect such an operation, convoluted steps to save a current configuration state of the processor, load a new configuration state that includes information regarding the desired rounding mode, perform the rounding operation, and restore the original processor state may occur. These operations can be time consuming, raise complexity, and consume excessive processor cycles. Further still, rounding operations performed in a processor typically occur according to a limited amount of rounding modes, namely those set forth in the Institute of Electrical and Electronics Engineers (IEEE) standard 754-1985 (published 1985), although as new programming languages evolve, support for other rounding modes may be desirable.

DETAILED DESCRIPTION

Figure 1:
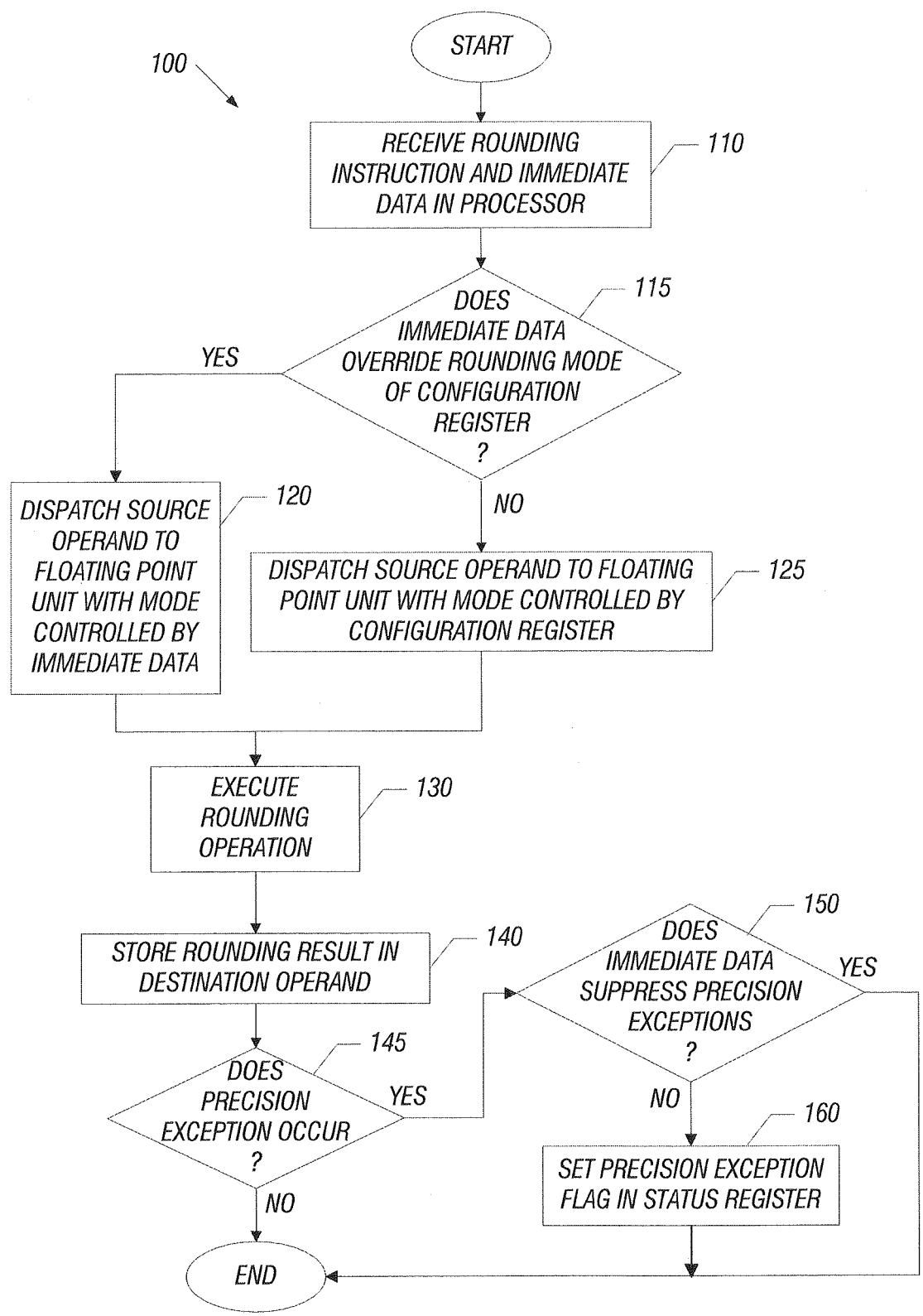
FIG. 1 is a flow diagram of a method in accordance with one embodiment of the present invention.

In various embodiments, multiple rounding instructions of an instruction set architecture (ISA) may be used to efficiently perform rounding operations in a processor, for example, in a floating point unit (FPU) of the processor. In addition to rounding modes set forth in the Institute of Electrical and Electronics Engineers (IEEE) standard 754-1985 (published 1985) (herein the IEEE Standard For Binary Floating-Point Arithmetic or IEEE std 754), embodiments may be used to perform rounding operations in accordance with additional rounding modes. For example, in some embodiments instructions may provide support for halfway away from zero and away from zero rounding operations, as described below. Furthermore, these rounding operations can be used with many data types. In some implementations, rounding operations can be performed on single instruction multiple data (SIMD) data types so that an instruction can be executed on extended data types, such as packed data elements, where multiple data elements are packed into a single location, such as an extended register of a processor.

To accommodate flexibility and provide for efficient instruction execution, embodiments may provide ISA-based instructions that can be executed on a source operand. These ISA-based instructions may be various implementations of round operations to perform a rounding to a nearest integer value of a source operand. Such source operands may already be in a limited precision format (i.e., not the result of an arithmetic operation, but rather data read from a register/memory). Such instructions may be used for various applications, including multimedia applications, gaming applications and so forth. Furthermore, embodiments may be implemented in compiler-based primitives to enable round operations that may be applicable to various programming languages. Note that in various embodiments, the round instructions may take as a source operand a floating point number, round it to the nearest integer value, and store the result, also as a floating point value having an integral value.

In various embodiments, control of the execution may be handled, at least in part, based on information received with the instruction, for example, immediate data received with the instruction. In different implementations, such immediate data may override a default rounding mode currently in use by the processor. In such override cases, the immediate data may further provide control of the rounding mode. Still further, the immediate data may provide for overriding of precision exceptions (i.e., precision suppression). Thus immediate data may be used to provide non-sticky control of a particular rounding operation, such that the operation may be performed in minimal cycles. This may be so, as when the immediate data received in connection with an instruction includes rounding control information, there may be no need to update such information present in a configuration register, such as an extended control and status register (CSR), e.g., the multimedia extension CSR (MXCSR) present in a processor in accordance with an Intel® architecture (e.g., an IA-32 architecture). However, understand that embodiments may be used in various processor types, and the scope of the present invention is not limited in this regard.

Referring now to FIG. 1, shown is a flow diagram of a method in accordance with one embodiment of the present invention. As shown in FIG. 1, method 100 may begin by receiving a rounding instruction and associated immediate data within a processor (block 110). For example, in many implementations a user-level instruction, e.g., an instruction of an ISA may be received in a processor. In addition to the instruction, immediate data may be provided therewith. As will be described further below, such immediate data may include multiple fields to control various aspects of the operation.

Referring still to FIG. 1, control passes from block 110 to diamond 115. At diamond 115, it may be determined whether the immediate data overrides a rounding mode of a configuration register. That is, a field of the immediate data may include an override indicator that indicates whether a default rounding mode is to be overridden. In various embodiments, such default rounding mode may be present in a field of a configuration register such as a CSR, e.g., the MXCSR, although the scope of the present invention is not limited in this regard. If the immediate data includes an override indicator, control passes to block 120. At block 120, a source operand identified by the instruction may be dispatched to, e.g., a floating point unit (FPU) of the processor. Furthermore, the source operand may be dispatched with information to control a rounding mode of the rounding operation. The control information may be obtained from the immediate data, i.e., as set forth in a rounding mode field of the immediate data. As will be described further below, in some implementations a control unit, such as a control selector unit of a processor, may receive the instruction and the immediate data and decode the immediate data to determine whether the default rounding mode is to be overridden and if so, obtain the rounding mode set forth in the immediate data.

Referring still to FIG. 1, if instead at diamond 115 it is determined that the immediate data does not include an override indicator, control passes to block 125. At block 125, the source operand may be dispatched for execution in the FPU. Furthermore, the rounding operation may be executed based on the default rounding mode set forth, e.g., in the configuration register.

In either event, control passes from both of blocks 120 and 125 to block 130, where the rounding operation may be executed. The rounding operation removes the fractional precision of the input (i.e., source operand) according to the rounding mode. In various embodiments, different manners of executing rounding operations may be realized. For example, in many implementations a FPU may include an adder and a rounding unit to perform rounding operations. To perform rounding modes in accordance with IEEE std 754, the adder may be provided with the source operand as a first operand and a constant value, e.g., zero for a second operand. The output of the adder may then be fed to the rounding unit, which may round the result in accordance with the selected mode of operation. The rounding unit may thus round its input value to an integral valued floating point result.

In other embodiments, additional rounding modes may be performed in addition to the IEEE std 754 rounding modes. In such implementations, the FPU adder may be fed the source operand and a particular data value as a second operand based on a value of the source operand and the rounding mode, as will be described further below. Then a rounding operation may be performed on the result, where the rounding operation may be an IEEE std 754 operation. In yet other implementations of extended rounding modes, the source operand and a zero value may be provided to the inputs to the FPU adder, and the resulting value may then be rounded in accordance with control information sent to the rounding unit.

After execution, the result of the rounding operation may be stored in a destination operand (block 140). In various embodiments, the destination operand may be an extended memory register of the processor, although the scope of the present invention is not so limited. Furthermore, it may be determined whether a precision exception occurred during the rounding operation (diamond 145). That is, it may be determined whether the rounding operation developed an imprecise result that would raise an exception. If not, method 100 may conclude.

If instead a precision exception is raised, control may pass to diamond 150. At diamond 150, it may be determined whether the immediate data includes a field to suppress precision exceptions. That is, in some implementations the immediate data may include a suppression field. A value of this field may indicate whether the associated rounding instruction should suppress a precision exception, if raised. If the precision suppression indicator is present, even if a precision exception occurs, no further action is taken and method 100 may conclude. If instead the immediate data does not include an indicator to suppress precision exceptions, control may pass to block 160. At block 160, a precision exception flag may be set in a status register. For example, in some implementations the status register may correspond to the MXCSR, although the scope of the present invention is not limited in this regard. Based on a state of this flag in the status register, a precision exception may be raised (e.g., if the flag is unmasked). If so, appropriate handling, e.g., via a software handler may be performed to handle the exception. If instead the flag is masked, even if a precision exception occurs and is flagged in the status register, no action may be taken with respect to the set flag. While described with this particular implementation in the embodiment of FIG. 1, it is to be understood the scope of the present invention is not limited in this regard.

Figure 2:
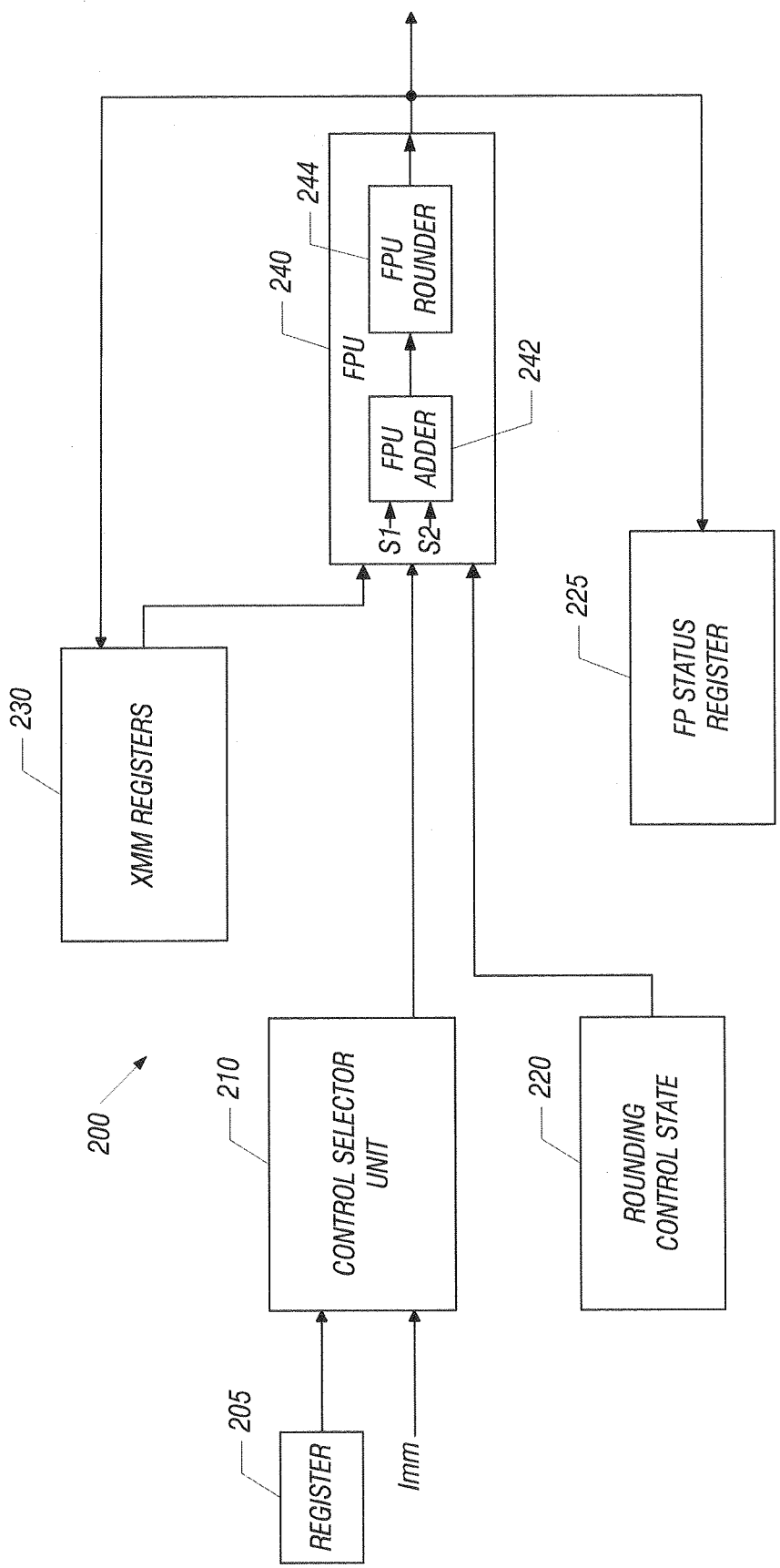
FIG. 2 is a block diagram of a portion of a processor in accordance with one embodiment of the present invention.

Referring now to FIG. 2, shown is a block diagram of a portion of a processor in accordance with one embodiment of the present invention. As shown in FIG. 2, processor 200 may include a control selector unit 210 that is coupled to receive incoming instruction information, e.g., produced by micro-operations (μops), from a register 205 (which may be a general-purpose processor register) and immediate data associated therewith. The μops may be generated responsive to a single instruction of an ISA for performing a given rounding operation. In various embodiments control selector unit 210, which may be implemented in hardware, software, firmware or combinations thereof, may decode the immediate data. Based on the immediate data, it may be determined whether a current rounding mode of the processor, e.g., as represented in a control or configuration register that stores a current rounding control state 220, is to be overridden. If so, control selector unit 210 may decode a mode field of the immediate data, namely a rounding mode field, to determine the proper rounding mode.

Control selector unit 210 may be coupled to a floating point unit (FPU) 240 to provide control instructions thereto based on the incoming information. As further shown in FIG. 2, an extended register file, such as so-called extended (XMM) registers 230 may be present within processor 200 that may include registers identified in an instruction to act as source and destination operands for a rounding operation. XMM registers 230 thus may be coupled to FPU 240 to provide source operands thereto and receive destination operands therefrom.

In various embodiments, FPU 240 may include various circuitry to perform operations on data. In the embodiment of FIG. 2, FPU 240 includes an FPU adder 242. Specifically, as shown in FIG. 2, FPU adder 242 may be coupled to receive incoming operands, e.g., a first source operand and a second source operand (i.e., operands S1 and S2). FPU 240 also may include an FPU rounder 244 coupled to an output of FPU adder 242. In various embodiments, FPU adder 242 may generate an infinitely precise result of an operation. However, given storage and other constraints, results may be rounded to provide a final result in a desired format, e.g., a single precision or double precision floating point element. Accordingly, FPU rounder 244 may receive an infinitely precise result from FPU adder 242 and perform a rounding operation, as dictated by a current rounding mode of processor 200, or based on control from immediate data obtained with an instruction, i.e., via control selector unit 210. Note that while FPU rounder 244 may generally receive infinitely precise results occurring as a result of mathematical operations in FPU adder 242, in various implementations the source operand provided with a rounding instruction may already be in limited precision format. In these instances, FPU rounder 244 may receive its input value (e.g., corresponding to a source operand of the given rounding instruction) and generate a rounded result corresponding, e.g., to a nearest integer value.

Thus based on a given rounding instruction, FPU 240 may perform a rounding operation on a given source operand, e.g., from one of XMM registers 230, as controlled by information from control selector unit 210. Furthermore, on completion of the rounding operation the result may be stored to, e.g., a different register within XMM registers 230. If a precision exception should occur during the operation, normally a flag may be set in a FP status register 225 to so indicate. However, in various embodiments if the immediate data associated with the rounding instruction indicates precision suppression, no such flag may be set. While described with this particular implementation in the embodiment of FIG. 2, it is to be understood the scope of the present invention is not limited in this regard. For example, in some embodiments control and status state, e.g., as represented by rounding control state 220 and FP status register 225, may be stored in a single CSR such as the MXCSR.

Figure 3:
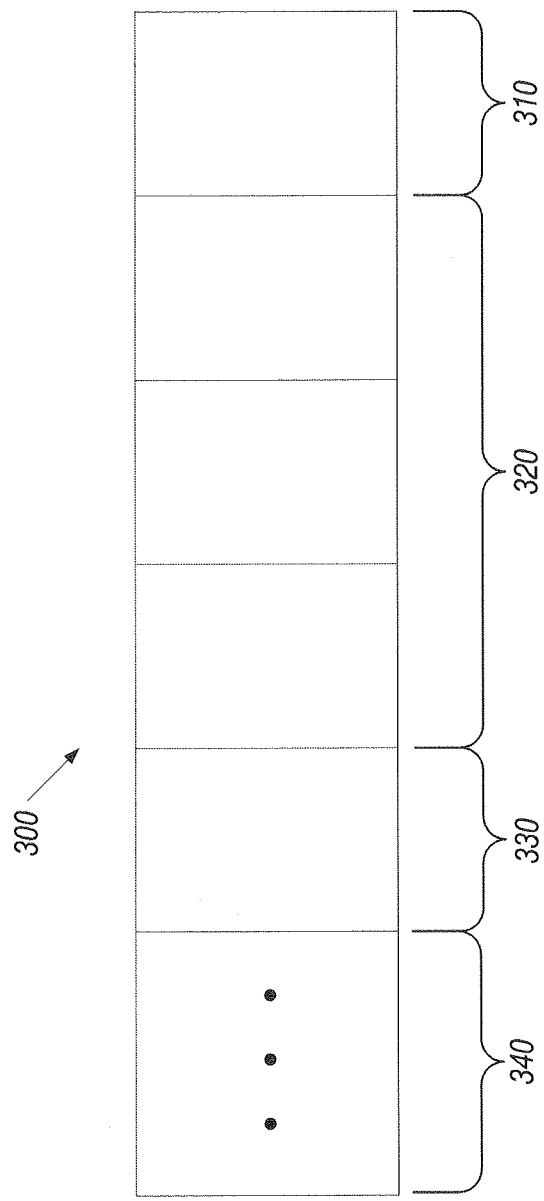
FIG. 3 is a block diagram of an immediate data element to be used in connection with an instruction in accordance with one embodiment of the present invention.

Note that immediate data may be provided to control selector unit 210 in various forms. For example, in some implementations the immediate data may be in the form of a single byte data element, although the scope of the present invention is not so limited. Furthermore, various manners of encoding control information within an immediate data element may be realized. Referring now to FIG. 3, shown is a block diagram of an immediate data element in accordance with one embodiment of the present invention. As shown in FIG. 3, immediate data element 300 may be an 8-bit word including an override indicator 310, a mode control field 320, a precision override indicator 330, and a reserved field 340. While shown with this particular implementation in the embodiment of FIG. 3, the scope of the present invention is not limited in this fashion.

In the embodiment of FIG. 3, override indicator 310 may be used to determine an override state of a rounding instruction associated with immediate data element 300. As shown in Table 1 below, override indicator 310 may be set at a logic low level to indicate overriding of a default rounding mode (e.g., as expressed by a configuration register such as the MXCSR). A logic high value indicates use of the default mode.

TABLE 1

Rounding Mode Override Indicator

0: Use Bits 1:3 of Immediate
1: Use Default Rounding Mode

If override indicator 310 indicates that the default rounding mode is to be overridden, rounding mode field 320 may be decoded to determine the rounding mode associated with a rounding instruction. As shown in Table 2 below, in some implementations six rounding modes may be supported, including the four rounding modes specified by the IEEE std 754, along with two extended rounding modes, which will be discussed further below.

TABLE 2

Rounding Mode Field

000: Nearest Even
001: Toward − ∞

TABLE 2-continued

Rounding Mode Field

010: Toward + ∞
011: Truncate (Round to Zero)
100: Half Away from Zero
101: Round Away from Zero Immediate data element 300 further includes a precision suppression indicator 330, which may be set to indicate allowance of inexact results such that no precision exception, even if occurring during operation of the associated instruction, will cause setting of an exception flag within a status register. Specifically, as shown in Table 3 below, precision suppression indicator 330 may take the following forms:

TABLE 3

Precision Suppression Indicator

1: Inexact (Precision) field is not updated
0: normal behavior

Note that precision suppression indicator 330 may be used in connection with user-level instructions of various languages, for example, C99, Fortran, and Java. Finally, reserved field 340 may be reserved for additional information, in some embodiments. Note further that the specific values set forth in Tables 1-3, along with the particular location and size of the indicators and fields is not limited and various alterations, modifications, and extensions are within the scope of the present invention.

As described above, in many implementations rounding operations may be performed responsive to single instructions of an ISA. In this way, user-level support is provided, and rounding operations can be efficiently performed. In a given ISA, multiple such rounding instructions may be present and available to handle specific rounding operations, such as rounding of double precision and single precision floating point values, as well as packed and scalar values. These rounding instructions may also be used to round off the fractional portion of floating-point data elements. In addition to the presence of ISA-level instructions, immediate data or other control field information may allow for efficient local control of rounding modes (among other attributes) without having to modify a current default state of a processor.

As shown in Table 4 below, various flavors of rounding instructions may be present within an ISA to enable efficient rounding operations on various types of data elements.

TABLE 4

| Instruction | Description |
| --- | --- |
| ROUNDPD xmm 1, xmm2/m128, imm8 | Round packed double precision floating-point values in xmm2/m128 and place the result in xmm1. The rounding mode is determined by imm8. |
| ROUNDPS xmm1, xmm2/m128, imm8 | Round packed single precision floating-point values in xmm2/m128 and place the result in xmm1. The rounding mode is determined by imm8. |
| ROUNDSD xmm1, xmm2/m64, imm8 | Round the low packed double precision floating-point value in xmm2/m64 and place the result in xmm1. The rounding mode is determined by imm8. |
| ROUNDSS xmm1, xmm2/m32, imm8 | Round the low packed single precision floating-point value in xmm2/m32 and place the result in xmm1. The rounding mode is determined by imm8. |

As an example of how these ISA instructions operate, the ROUNDPD instruction may be used to round two double precision floating-point values in a source operand (i.e., second operand, which may be obtained from an XMM register or memory) by the rounding mode specified in the immediate element (i.e., IMM8) and place the result in the destination operand (i.e., the first operand, which may be an XMM register). The immediate element may specify control fields for the rounding operation. With reference back to Tables 1-3, bit 4 (i.e., indicator 330 of FIG. 3) of the immediate data may control processor behavior for a precision exception, while bit 0 (i.e., indicator 310 of FIG. 3) may select the source of rounding mode control. Finally, bits 3:1 (i.e., field 320 of FIG. 3) may specify a non-sticky rounding mode value. Note that in some embodiments, if any source operand is a signaling not a number (SNaN) then it will be converted to a quiet NaN (QNaN). If a configuration register is set for denormals as zeros (DAZ), then denormals may be converted to zero before rounding. If a configuration register is set for flush denormals to zeros (FTZ), then denormals may be converted to zero after rounding.

As a further example of how these ISA instructions may operate, the ROUNDPS instruction may be used to round four packed single precision floating-point values in a source operand and place the result in a destination operand. For purposes of illustration, the specific round instruction may take the following form:

ROUNDPS xmm0, xmm1, imm8 (round to nearest integer).

This instruction may take packed single precision values in a first register, i.e., xmm1, round each value to the nearest integer value as set forth by the rounding mode of the immediate data (i.e., imm8), and store the result in a second register, i.e., xmm0. Table 5 below shows representative values present in the source operand (i.e., xmm1), each corresponding to a limited precision floating point value, and the resulting rounded values as stored in the destination operand (i.e., xmm0), corresponding to integer valued floating point numbers, namely the nearest integer values to the original source values.

TABLE 5

| 1.01f | 2.9f | 3.6f | 4.2f | xmm1 |
| 1.0f  | 3.0f | 4.0f | 4.0f | xmm0 |

Note that in further implementations, a rounding operation may be responsive to an instruction to produce an integer value (i.e., as opposed to integral valued FP values) from a source FP value. Other embodiments may enable rounding to a lower precision floating point representation. Thus embodiments may provide an efficient means of rounding source values according to a standard rounding mode or specialized rounding mode controlled by either a default rounding mode in a configuration register or a local rounding mode set forth in immediate data associated with the instruction.

Figure 4:
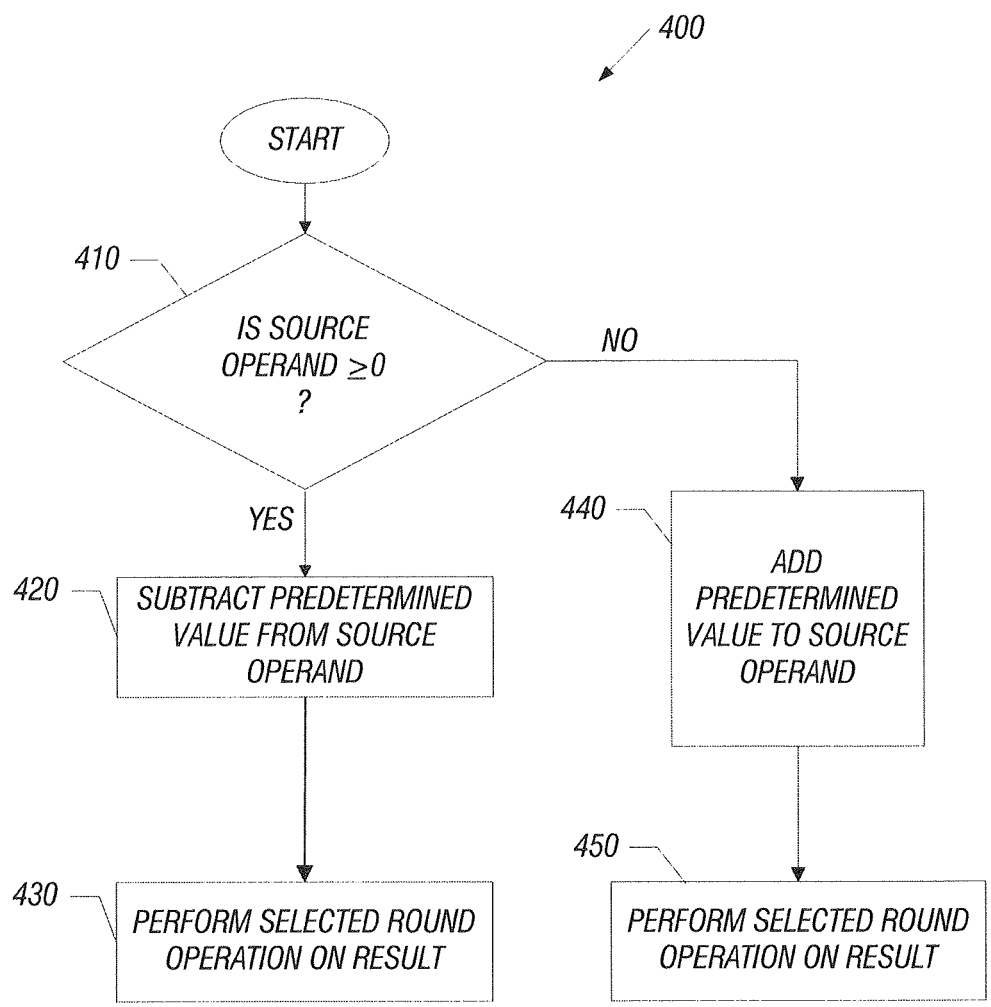
FIG. 4 is a flow diagram of a method for performing a rounding operation in accordance with an embodiment of the present invention.

In various embodiments, immediate data may provide control information to perform a rounding mode that is different than the IEEE std 754 rounding operations. These rounding modes may include a round halfway away from zero and a round away from zero rounding mode. Referring now to FIG. 4, shown is a flow diagram of a method of performing rounding operations in accordance with an embodiment of the present invention. As shown in FIG. 4, method 400 may be used to perform these extended rounding modes. Method 400 may begin by determining if a source operand is greater than or equal to zero (diamond 410). If so, control may pass to block 420, where a predetermined value may be subtracted from the source operand (block 420). For example, a FP adder may subtract a given value from the source operand based on the particular rounding mode selected. Of course, this subtraction may be performed as an addition with a negative value for the predetermined value. Then, the selected rounding operation may be performed on the result of this FP add (block 430). In some implementations, an IEEE std 754 round operation such as a truncate (also called round to zero) may be performed on the result to obtain the extended rounding mode result. If instead at diamond 410 it is determined that the source operand is less than zero, control passes to block 440. At block 440, a predetermined value (which may be the same value as above) may be added to the source operand in the FP adder. Then, at block 450 the selected round operation may be performed on the result to obtain the resulting rounded value.

While the scope of the present invention is not limited in this regard, a round halfway away from zero operation may use a value of 0.5 as its predetermined value, while a round away from zero operation may use a 1⁻, which corresponds to the closest representable FP value smaller than, but not equal to, one. For single precision and double precision FP values, 0.5 may correspond to, respectively 0x3f000000 and 0x3fe0000000000000. For single precision and double precision FP values, −0.5 may correspond to, respectively 0xbf000000 and 0xbfe0000000000000. For single precision and double precision FP values, 1⁻ may correspond to, respectively 0x3f7fffff and 0x3fefffffffffffff. For single precision and double precision FP values, −1⁻ may correspond to, respectively 0xbf7fffff and 0xbfefffffffffffff. Shown in Table 6 below are source code examples for performing these operations.

TABLE 6

ROUND_HALF_AWAY_ZERO(A):
IF (A < = 0)
    A←ROUND_TOWARD_ZERO(A − 0.5)
ELSE IF (A > 0)
    A←ROUND_TOWARD_ZERO(A + 0.5)
2) Round Away From Zero (A). "The result shall be the value closest to
and no smaller in magnitude than the infinitely precise result."
IF (A < = 0)
    A←ROUND_TOWARD_ZERO(A − 1)
ELSE IF (A > 0)
    A←ROUND_TOWARD_ZERO(A + 1)

In these examples, the operation ROUND_TOWARD_ZERO is the IEEE std 754 truncate operation, which is performed on the result of the addition/subtraction operation. Note that in performing these extended rounding mode operations, the predetermined values may be provided as second source operands to the FP adder (e.g., as S2 in the embodiment of FIG. 2). Alternately, in some embodiments as with other rounding operations, the second source operand may be zero, and control signals may be sent to a rounding unit to implement the selected extended rounding mode operation.

Thus in various embodiments, enhancements to performing a round may be realized. These enhancements may avoid the need to perform various operations such as saving a control register's state, performing a dummy FP operation, and resetting the state, or even the approximate simplification of converting a number to an integer and back to floating point. By suppressing inexact precision exceptions, conformance different languages' support for rounding may be simplified, while implementations may also adhere to standard rounding modes for certain rounding functions, e.g., in the C99 language.

Figure 5:
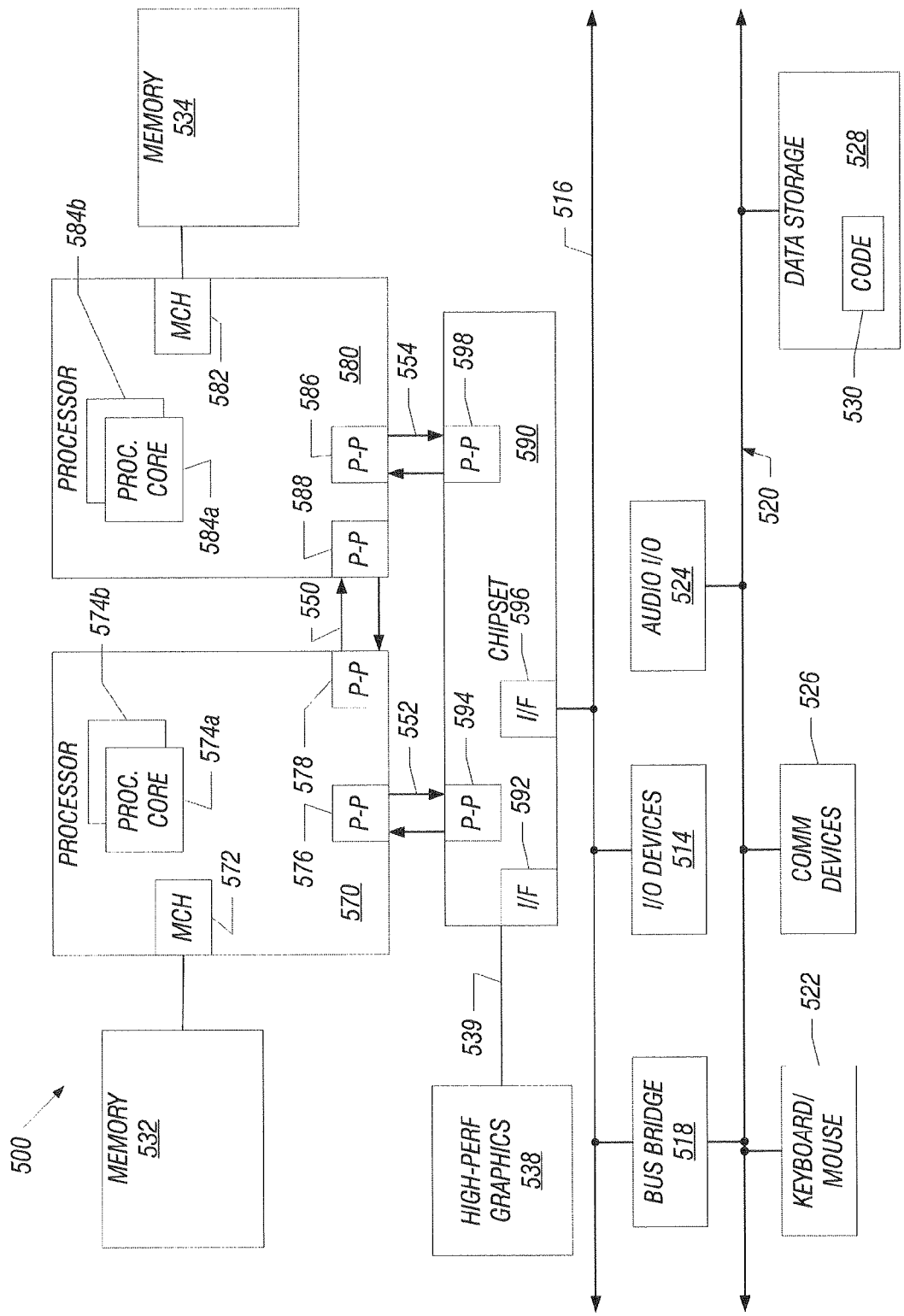
FIG. 5 is a block diagram of a system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b). Note that each of the cores may perform rounding operations responsive to ISA-level instructions in accordance with an embodiment of the present invention.

First processor 570 further includes point-to-point (P-P) interfaces 576 and 578. Similarly, second processor 580 includes P-P interfaces 586 and 588. As shown in FIG. 5, memory controller hubs (MCH's) 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 5, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as a PCI Express™ bus or another third generation input/output (I/O) interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Note that other architectures are possible. For example, instead of the point-to-point architecture of FIG. 5, a system may implement a multi-drop bus or another such architecture.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a controller to receive a round instruction of an instruction set architecture (ISA) having a format including a source operand, a destination operand and an immediate data element, wherein the controller is to decode the immediate data element to determine if a default round mode is to be overridden based on an override indicator of the immediate data element, and if the default round mode is to be overridden to decode a round mode field of the immediate data element;
an execution unit coupled to the controller to execute a round operation responsive to the round instruction, wherein the execution unit is to execute the round operation according to the round mode field of the immediate data element if the default round mode is to be overridden based on the override indicator; and
a configuration register, wherein when the configuration register is set for denormal numbers as zero and the source operand is a denormal number, the processor is to convert the source operand to zero before execution of the round operation.

2. The processor of claim 1, wherein the round operation is to round each of a plurality of packed floating point values in the source operand to integer valued floating point values and store each of the plurality of integer valued floating point values in the destination operand.

3. The processor of claim 1, wherein the controller is to determine if a precision exception is to be suppressed, based on a suppression indicator of the immediate data element.

4. The processor of claim 1, wherein the execution unit comprises:
a floating point adder to receive a first operand and a second operand; and
a rounder coupled to an output of the floating point adder to perform the round operation.

5. The processor of claim 4, wherein the controller is to provide control signals to the rounder to perform the round operation.

6. The processor of claim 4, wherein the floating point adder is to add a first value to the source operand if the source operand is at least equal to a threshold value, otherwise the floating point adder is to subtract the first value from the source operand.

7. The processor of claim 1, wherein the execution unit is to execute the round operation on at least one element of the source operand to an integer valued floating point value, wherein the source operand comprises a limited precision floating point value.

8. The processor of claim 1, wherein the execution unit is to execute the round operation on at least one element of the source operand to an integer value, wherein the source operand comprises a floating point value.

9. The processor of claim 1, wherein the execution unit is to convert the source operand from a signaling not a number to a quiet not a number.

10. A non-transitory machine-readable medium having stored thereon instructions, which if performed by a machine cause the machine to perform a method comprising:
receiving a user-level rounding instruction of an instruction set architecture (ISA) having a format including a source operand, a destination operand and an immediate value, in a control selector unit of a processor;

determining if a rounding mode override indicator of the immediate value is active by decoding the immediate value in the control selector unit;

if so, obtaining a rounding mode field of the immediate value and dispatching the source operand and information to control a rounding mode to a floating point unit of the processor coupled to the control selector unit; and executing a rounding operation on the source operand in the floating point unit of the processor responsive to the user-level rounding instruction and according to the information, including if the source operand is a signaling not a number, converting the source operand to a quiet not a number.

11. The non-transitory machine-readable medium of claim 10, wherein the method further comprises executing the rounding operation responsive to the user-level rounding instruction and according to a rounding mode set forth in a control register of the processor if the rounding mode override indicator of the immediate value is not active.

12. The non-transitory machine-readable medium of claim 10, wherein the method further comprises maintaining a value of a control register including a default rounding mode during execution of the rounding operation.

13. The non-transitory machine-readable medium of claim 10, wherein the method further comprises executing the rounding operation according to a round halfway away from zero mode set forth in the immediate value.

14. The non-transitory machine-readable medium of claim 10, wherein the method further comprises storing a result of the rounding operation in a destination storage area corresponding to the destination operand as an integer valued floating point value, wherein the source operand comprises a limited precision floating point value.

15. The non-transitory machine-readable medium of claim 10, wherein the method further comprises suppressing a precision exception that results from the rounding operation if a precision suppression indicator of the immediate value is active.

16. The non-transitory machine-readable medium of claim 10, wherein the user-level rounding instruction comprises an instruction of the instruction set architecture to perform the rounding operation on a plurality of single instruction multiple data (SIMD) elements of the source operand.

17. A system comprising:
a processor comprising:
an execution unit to execute a round instruction on a first operand to obtain a rounded result in accordance with a round mode portion of a control field associated with the round instruction if an override indicator separate from the round mode portion is present in the control field;

a selector unit coupled to the execution unit to receive the round instruction and the control field, wherein the selector unit is to decode the round mode portion of the control field and generate control signals therefrom if the override indicator is present and to provide the control signals to the execution unit to cause execution of the round instruction, wherein when the first operand is a signaling not a number, the execution unit is to convert the first operand from the signaling not a number to a quiet not a number, the round mode portion to encode one of a plurality of round modes; and a register to store a default round mode for the execution unit and to store status information regarding execution in the execution unit, wherein the execution unit is to execute the round instruction in accordance with a different round mode than the default round mode if the override indicator is present in the control field, and to not update the status information indicative of a precision exception caused by execution of the round instruction if a suppression indicator is present in the control field; and a dynamic random access memory (DRAM) coupled to the processor.

18. The system of claim 17, wherein the execution unit comprises a floating point unit to perform a round operation on the first operand responsive to the control signals from the selector unit, wherein the first operand comprises a limited precision value.

19. The system of claim 17, wherein the execution unit is to perform the different round mode via addition of a first value to the first operand if the first operand is less than or equal to a threshold value, otherwise via addition of a second value to the first operand, wherein the first value comprises a negative floating point version of the second value.

20. The system of claim 17, wherein the processor further comprises a configuration register, wherein when the configuration register is set for denormal numbers as zero and the first operand is a denormal number, the processor is to convert the first operand to zero before execution of the round instruction.

* * * * *